(12) United States Patent
Hays et al.

(10) Patent No.: US 8,118,278 B2
(45) Date of Patent: Feb. 21, 2012

(54) ASEPTIC FLOW CONTROL VALVE WITH OUTSIDE DIAMETER VALVE CLOSURE

(75) Inventors: Wayne Hays, Tulsa, OK (US); Ray Gardner, Broken Arrow, OK (US)

(73) Assignee: Badger Meter, Inc., Milwaukee, WI (US)

( * ) Notice: Subject to any disclaimer, the term of this patent is extended or adjusted under 35 U.S.C. 154(b) by 577 days.

(21) Appl. No.: 12/329,705

(22) Filed: Dec. 8, 2008

(65) Prior Publication Data
US 2010/0140524 A1 Jun. 10, 2010

(51) Int. Cl.
*F16K 7/12* (2006.01)
(52) U.S. Cl. .............. 251/331; 251/333; 251/335.2
(58) Field of Classification Search .......... 251/331, 251/335.2, 333, 334
See application file for complete search history.

(56) References Cited

U.S. PATENT DOCUMENTS

| | | | |
|---|---|---|---|
| 1,992,043 A | 2/1935 | Saunders | |
| 2,381,544 A | 8/1945 | Jacobsen | |
| 2,605,991 A | 8/1952 | Kaye | |
| 2,654,559 A | 10/1953 | Franck | |
| 2,716,017 A | 8/1955 | Linker | |
| 2,725,211 A | 11/1955 | Boteler | |
| 2,988,322 A | 6/1961 | Anderson | |
| 3,078,066 A | 2/1963 | Moore | |
| 3,103,342 A | 9/1963 | Boteler | |
| 3,310,280 A | 3/1967 | Boteler | |
| 3,426,999 A | 2/1969 | Toinet | |
| 4,014,514 A | 3/1977 | Priese et al. | |
| 4,221,361 A | 9/1980 | Weingarten | |
| 4,319,737 A | 3/1982 | Waterfield | |
| 4,609,178 A | 9/1986 | Baumann | |
| 5,083,746 A | 1/1992 | Fransworth | |
| 5,167,397 A | 12/1992 | Farnsworth | |
| 5,758,864 A | 6/1998 | Asai | |
| 5,836,571 A * | 11/1998 | Streitman et al. | 251/331 |
| 6,321,776 B1 | 11/2001 | Pratt et al. | |
| 6,405,996 B1 * | 6/2002 | Alsop et al. | 251/331 |
| 7,364,132 B2 | 4/2008 | Browne et al. | |
| 7,377,483 B2 | 5/2008 | Iwabuchi et al. | |
| 2002/0100503 A1* | 8/2002 | Browne et al. | 137/331 |
| 2004/0262562 A1 | 12/2004 | Maula et al. | |
| 2005/0253100 A1 | 11/2005 | Yasue et al. | |

FOREIGN PATENT DOCUMENTS
GB 860 026 A 2/1961
* cited by examiner

*Primary Examiner* — John Bastianelli
(74) *Attorney, Agent, or Firm* — Boyle Fredrickson, S.C.

(57) ABSTRACT

An aseptic diaphragm valve in which a valve seat (37) is formed by a groove including a concave surface of engagement that positioned along an outer diameter of an upper end of an inlet tube (32), and a resilient valve member portion (41) that is annular in extent with a convex surface that moves into the groove to contact the concave surface (37) around the outer diameter of the inlet tube (32) to close the valve. The valve member portion (41) has at least a coating of polytetrafluoroethylene (47) or equivalent material.

13 Claims, 6 Drawing Sheets

FLOW STREAM

ASEPTIC FLOW CONTROL VALVE WITH OUTSIDE DIAMETER VALVE CLOSURE

TECHNICAL FIELD

This invention relates to diaphragm valves used for sanitary and pharmaceutical applications in which fluid streams contain micro-organisms that must be conveyed without damage to due to operation of the valve closures.

DESCRIPTION OF THE BACKGROUND ART

There is presently a need in the bioprocessing and pharmaceutical industries for an aseptic control valve that provides both the characterized flow performance of a control valve and the design features and performance requirements that the handling of sterile and biological flow streams requires.

The requirements for materials, configurations, cleanliness and performance of aseptic valves are provided in ASME Standard BPE-2005.

Typically, all control valves that provide characterized control do so by utilizing a metering function inherent to their individual design. This metering or control function is normally defined by one of the following valve types:

a) a shaped plug moving in a linear manner axially within a round orifice or seat ring;

b) a cage with a contoured opening with a linear axially moving piston inside the cage; or c) a simple on/off quick opening style seat often characterized by a very short stroke.

In each of these examples, the shape is such that the flow passes between the plug/piston and the seat/cage and as the valve stroke (travel) is adjusted, a characterized flow pattern is attempted. The aseptic and pharmaceutical markets have some unique requirements. These needs include inert surfaces, zero unswept geometries and the ability to create an environment that can secure the survivability of possible micro-organisms within the flow stream. To provide fluid stream compatibility, the internal surfaces are normally made of 316/316L stainless steel and are held to very fine finished surfaces. To support the stringent requirements for a clean and sterile environment, there can be no corners, cracks, seams or voids that would allow material from the fluid stream to accumulate and at a later time, contaminate the flow stream. Very fine surface finishes also add to the cleanliness attribute.

And finally, there is a need for micro-organisms in the flow stream to survive the interaction with the control valve. The most detrimental interaction would occur when the plug/piston engages the seat/cage in valve types a) and b) above. While this is absolutely necessary for fluid control it is not good for microbes in the stream. Normally, both of these components are made of metal and when they close, thus stopping flow, the metal to metal contact will literally crush the microbes in the stream, clearly an undesirable occurrence. Design limitations of the valve types a) and b) above do not allow them to meet the standards in the bioprocessing and pharmaceutical markets. These designs do not meet the needs but can provide good control of the fluid stream.

Whereas the valve type 'c' designs do meet the design/suitability needs of those markets, their ability to perform as a control valve is very poor. These types of trims are normally referred to as a "Quick Opening" trims.

Their length travel is quite short and due to the non-contoured shapes and lack of interaction between the seat and plug, their use as a capable control valve is minimal. For a process to be valid, whether it is biological, pharmaceutical, chemical, nuclear or any other industry, the valves that control these processes must, without exception, provide a predictable flow. Furthermore, the more characterized the flow, the better suited it is for optimum process control.

The technical problem to resolve is the need for a control valve that meets the design and suitability needs for cleanliness, inertness, and survivability of microbes in the flow stream all while providing flow control that meets the needs of sound, acceptable process control practice and to provide a valve that produces a characteristic that supports these control needs. No current valve product is believed to satisfy these needs.

SUMMARY OF THE INVENTION

The valve of the present invention provides a superior characterized flow control performance, while meeting the standards of ASME BPE-2005 for aseptic valves.

The invention is incorporated in a diaphragm valve in which a valve seat is formed by a groove including a concave surface of engagement that is located around an outer diameter of a tubular portion of a valve body, and a resilient valve member portion of a flexible diaphragm that is annular in extent with a convex surface that moves into the groove to contact the concave surface around the outer diameter of the tubular portion of the valve body to close the valve.

The valve provides a soft, resilient open-and-close contact between the valve member and valve seat that is not destructive of micro-organisms in the flow stream.

In a further aspect of the invention, the annular valve member is an elastomeric material coated with Teflon® or an equivalent that will satisfy ASME BPE-2005 or is completely made of Teflon® or an equivalent material.

The valve also has a valve actuator which can be pneumatic, hydraulic or electrical.

In a further aspect of the invention, the valve seat has a rising portion having an angle of 11-12 degrees from a plane defined by the upper end of the tubular portion that extends around the valve opening the valve member has a complementary portion with an angle of 11-12 degrees from perpendicular to a flat, centermost portion of the diaphragm, so that the sidewall of the valve member conforms in shape to the sidewall in the groove.

In a further aspect of the invention, for a nominal valve size of ½ inch; the cross sectional width dimension of the mating valve surfaces in a range of 0.40-0.50 inches.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENT

Figure 1:
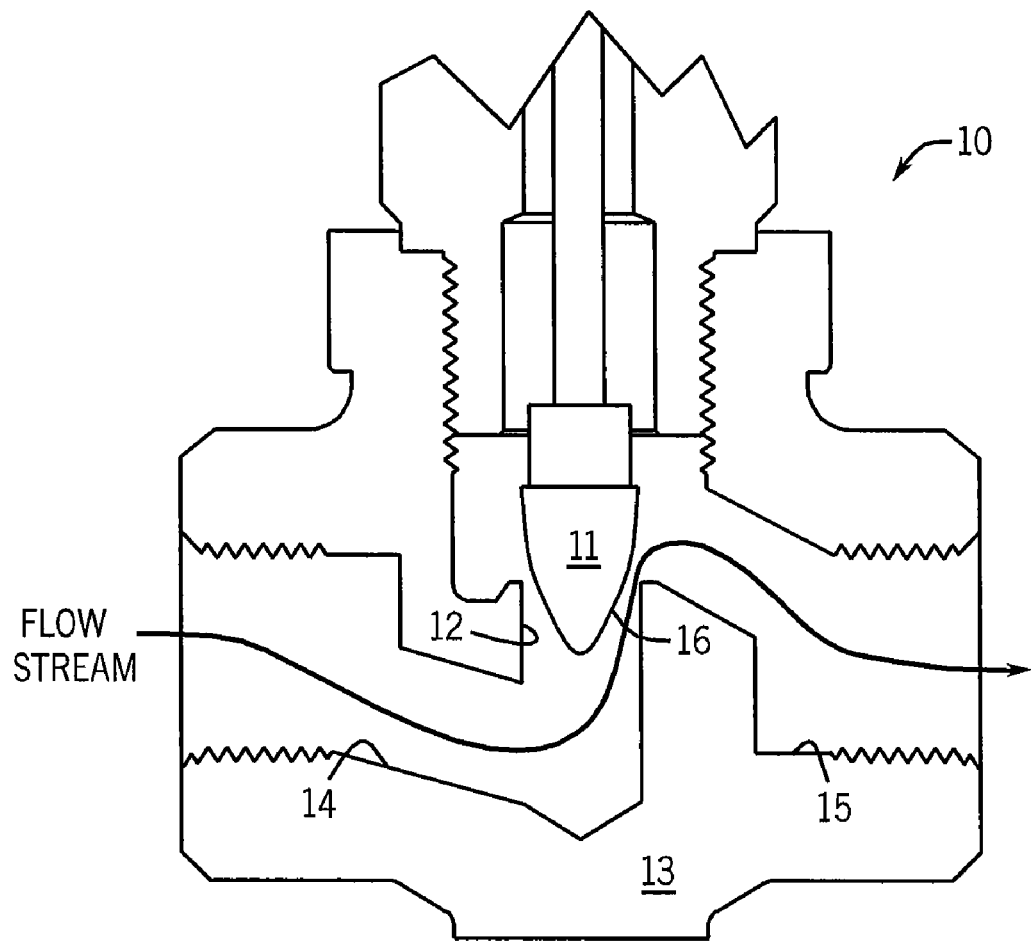
FIG. 1 is a schematic view of one type of valve in the prior art.

FIG. 1 is a schematic of a type 'a' valve design 10 of the prior art having a plug 11 that is inserted in a valve seat 12. The valve seat 12 is formed in a body 13 where an inlet channel 14 communicates with an outlet channel 15. To facilitate the very tight manufacturing tolerances required to produce this form of control, both parts 11, 12 are made from metal. The plug 12 has a very specific shape and profile 16 that produces the highly desirable "characterized" flow which is desirable from a control perspective.

Finishes are as important to the design of an acceptable aseptic valve as are dimensional requirements. As discussed earlier, a metal to metal design may have a negative effect on living microbes in the fluid stream. There are also a variety of internal cleanliness issues that are not met by this design.

Figure 2:
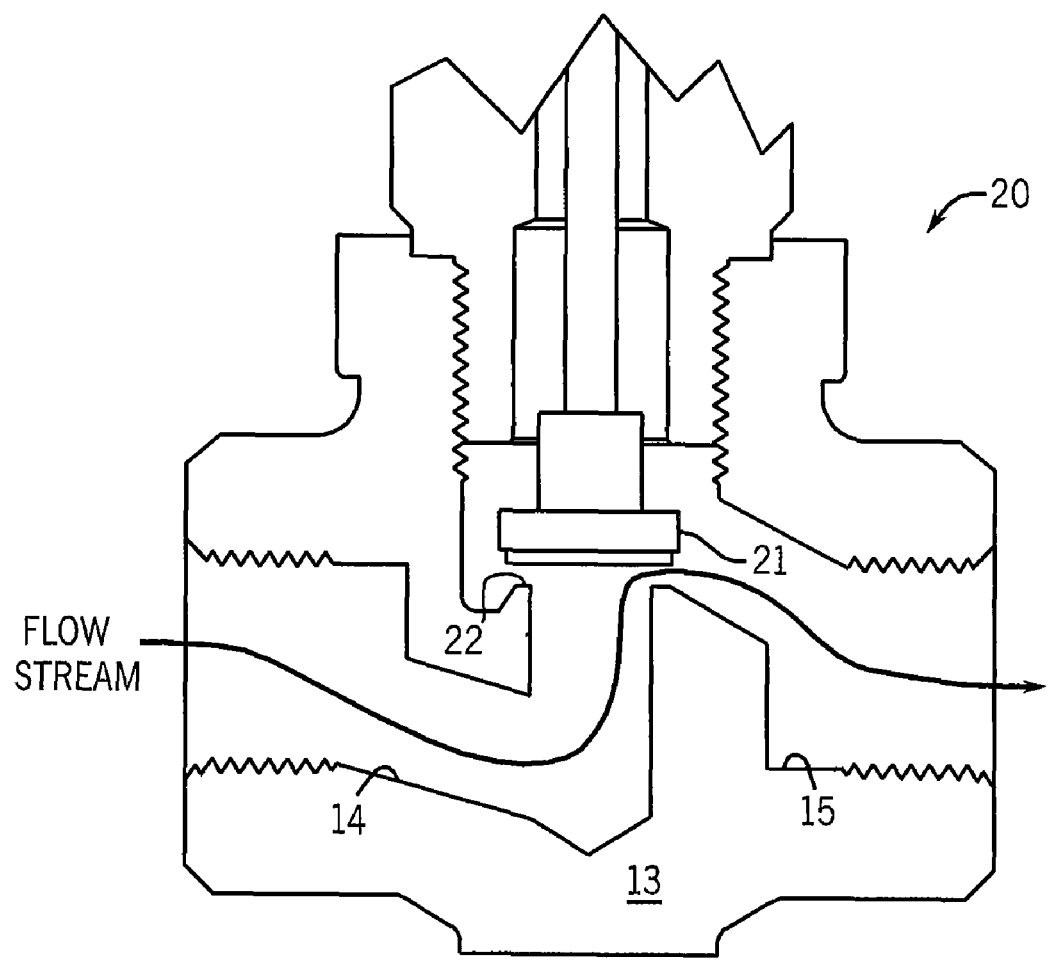
FIG. 2 is a schematic view of another type of valve in the prior art.

FIG. 2 is representative of a quick-opening trim 20. These types of trims 20 can meet the survivability needs since the moveable valve member 21 is normally made from Teflon® or another type of polytetrafluoroethylene (also "PTFE") or from an elastomer that is coated with one of these PTFE materials. This material provides inertness plus a "softness" that promotes microbe survivability even when the valve member 21 is closed against a valve seat 22. Due to the material of the valve member, the cleanliness standard can be met. However, the design still lacks other features required by the target market. Such valves are suitable for many processes. However, this valve configuration does not provide a suitable characteristic of increased flow in response to travel of the valve stem. There are designs that use a combination of "quick-opening" trim and a diaphragm design. These valves, while meeting the needs of the aseptic market, still lack a suitable flow characteristic.

Figure 3:
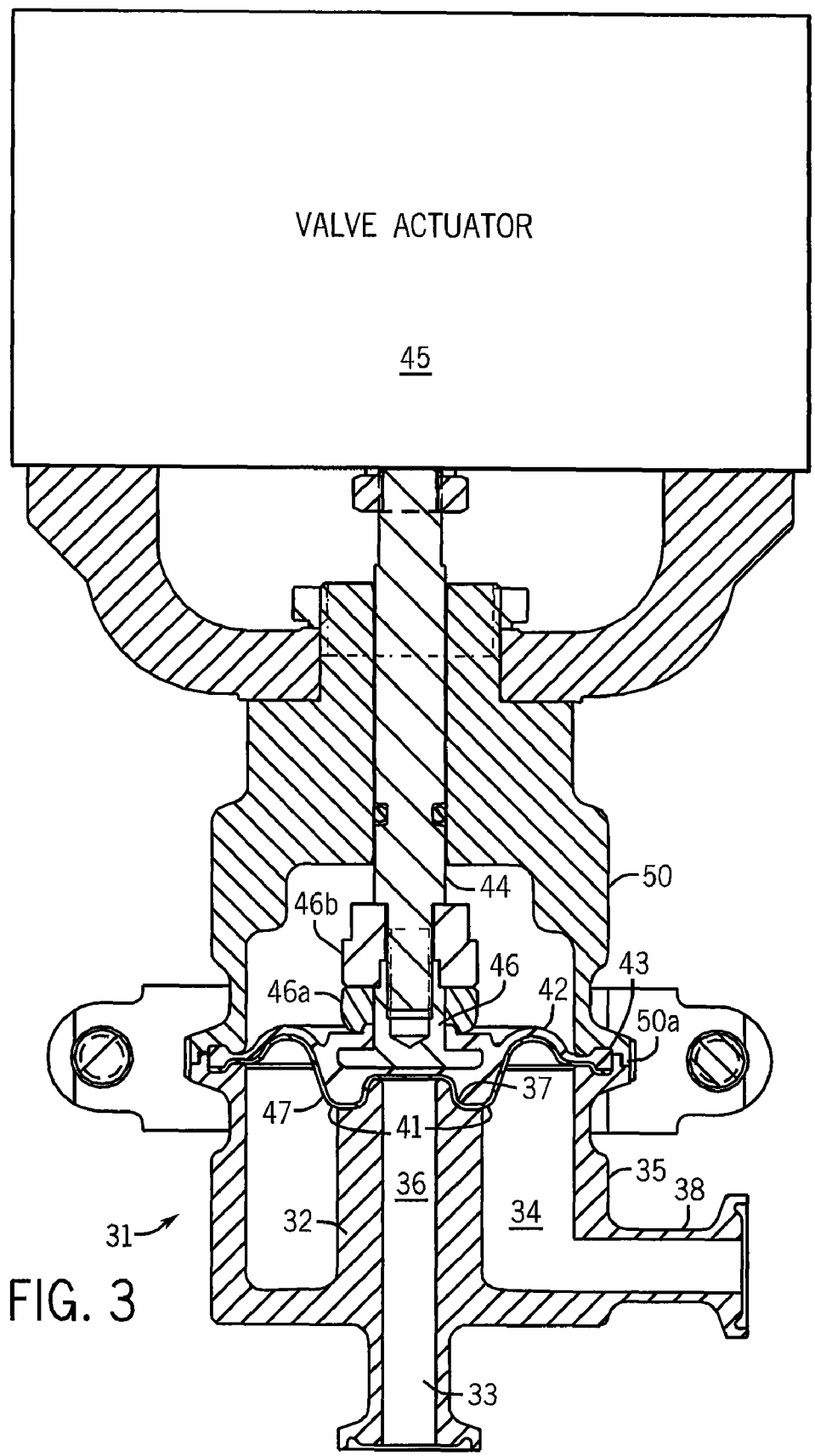
FIG. 3 is a sectional view of a valve assembly of the present invention.
Figure 4:
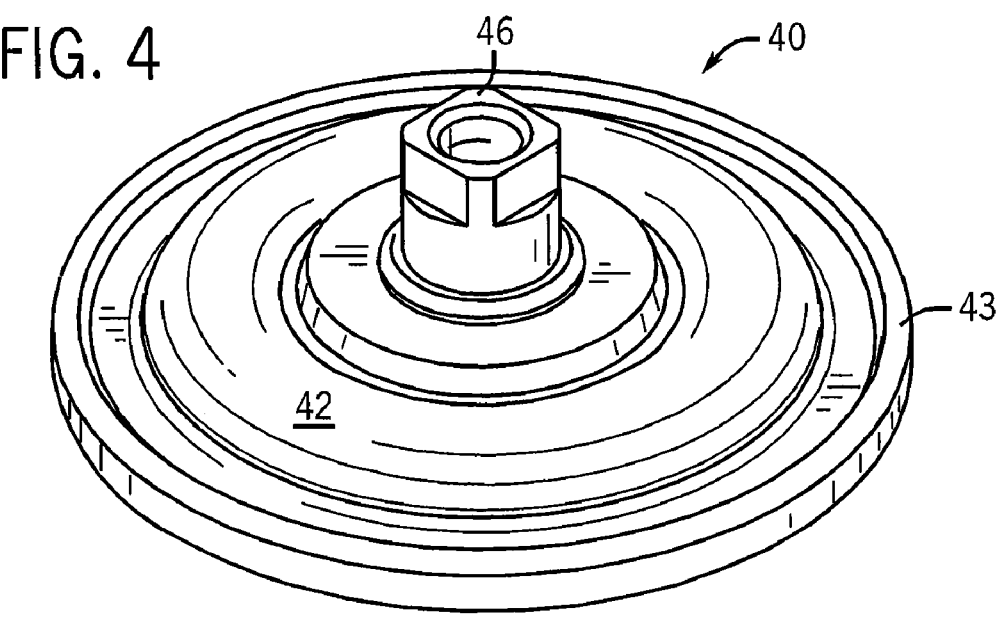
FIGS. 4 and 5 are perspective views of parts taken from the assembly of FIG. 3.

FIG. 3 illustrates an aseptic valve 30 of the present invention. The valve 30 includes a valve body 31 that includes a tubular inlet portion 32 having a centrally disposed fluid passageway 33. The valve body 31 also has a fluid outlet chamber 34 surrounding said tubular inlet portion 32 and separating the tubular inlet portion 32 from an outer wall 35 of the valve body 31. The tubular inlet portion 32 also has an upper valve opening 36 communicating between the fluid passageway 33 and the fluid outlet chamber 34, where a valve seat 37 is formed around the upper valve opening 36 and a small rim 36a around the valve opening 36. Fluid flows into passageway 33 and through the valve opening 36 to the fluid outlet chamber 34, and from there out of a fluid outlet spout 38.

Figure 5:
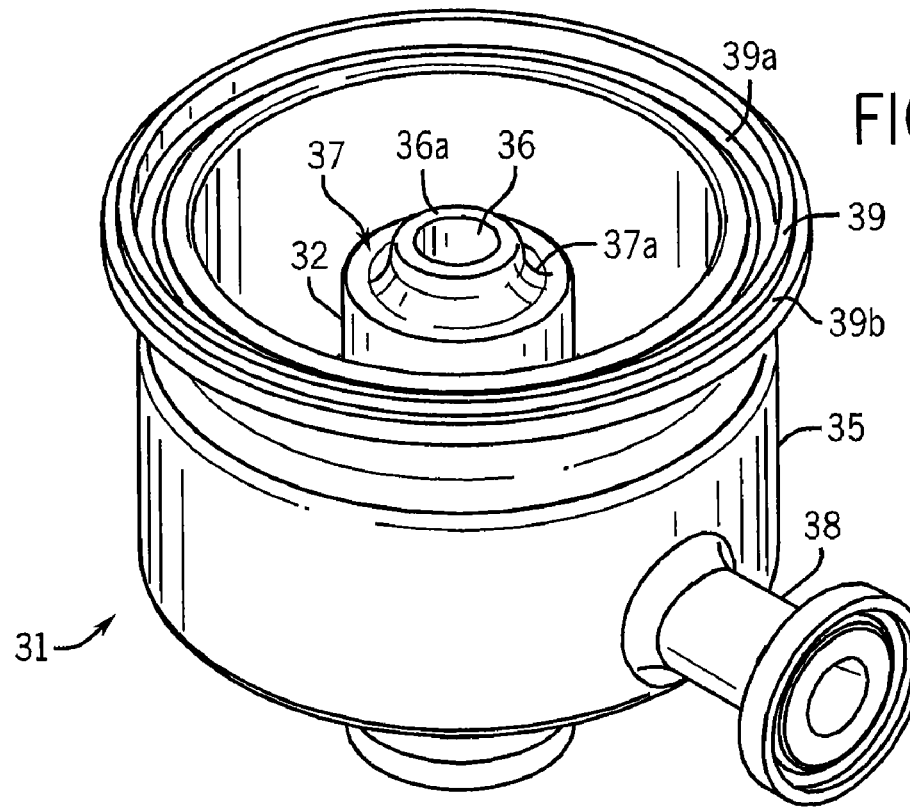
Figure 8:
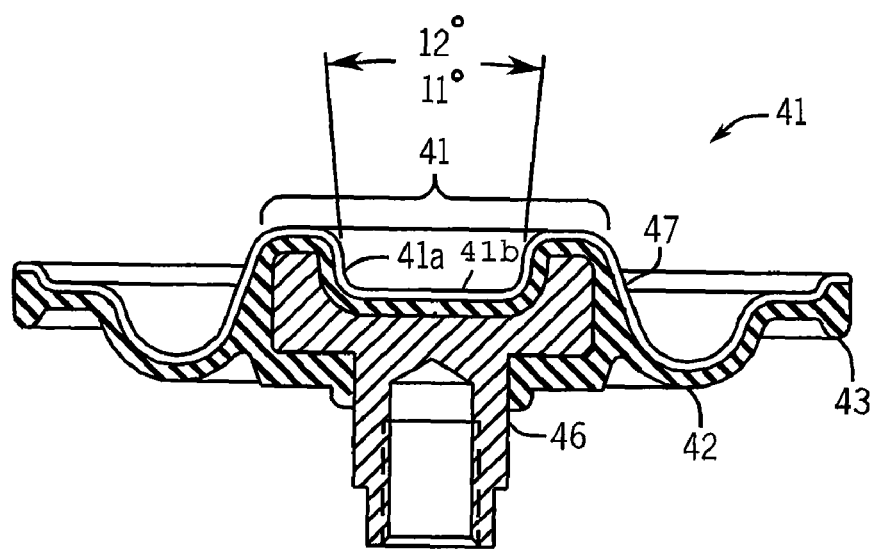
FIG. 8 is a transverse sectional view taken in the plane indicated by line 8-8 in FIG. 6.

The valve opening 36 is opened and closed by a central portion 41 of a diaphragm member 40 as seen in FIG. 8. The central portion 41 of the diaphragm 40 is connected by a flexible web portion 42 to an outer edge stationary portion 43 which is T-shaped in cross section and which is trapped and held in a cylindrical groove 39a (FIGS. 3, 5) in an upper rim 39 of the outer wall 35 of the valve body 31 by an upper housing part 50. As seen in FIG. 5, the valve body 31 has a circular groove 39b on its outer rim to receive a projection 50a on the rim of the upper housing part 50 seen in FIG. 3.

The material of the diaphragm 40 is an aseptic membranous material that is formed or installed around a valve coupling member 46 (FIG. 3). The material of the diaphragm 40 is preferably an elastomer that having a coating 47 of Teflon® or another type of polytetrafluoroethylene ("PTFE") material as illustrated in FIG. 3, or can be entirely made of PTFE material.

The valve coupling member 46 has a threaded connection to a stem 44, which in turn in connected to a valve actuator 45. Collars 46a and 46b (FIG. 3) assist this connection and provide a stop for upward travel. This connection to the valve actuator 45 provides for movement of the valve member 41 into the valve seat 37 to close the valve and for retracting movement out the valve seat 37 to open the valve. The valve stem 44 moves longitudinally forward to close the valve and is retracted longitudinally to open the valve. The valve actuator 45 can be electrical, pneumatic or hydraulic.

Referring again to FIG. 5, the valve seat 37 is provided by a tubular portion 32 and by a groove 37 formed around an outer diameter of the tubular portion 32, such that the resilient annular valve member 41 of aseptic material contacts the surface of the groove 37 around the outer diameter of the tubular portion 32 of the valve body 31 to close the valve as seen in FIG. 3.

Figures 6, 7:
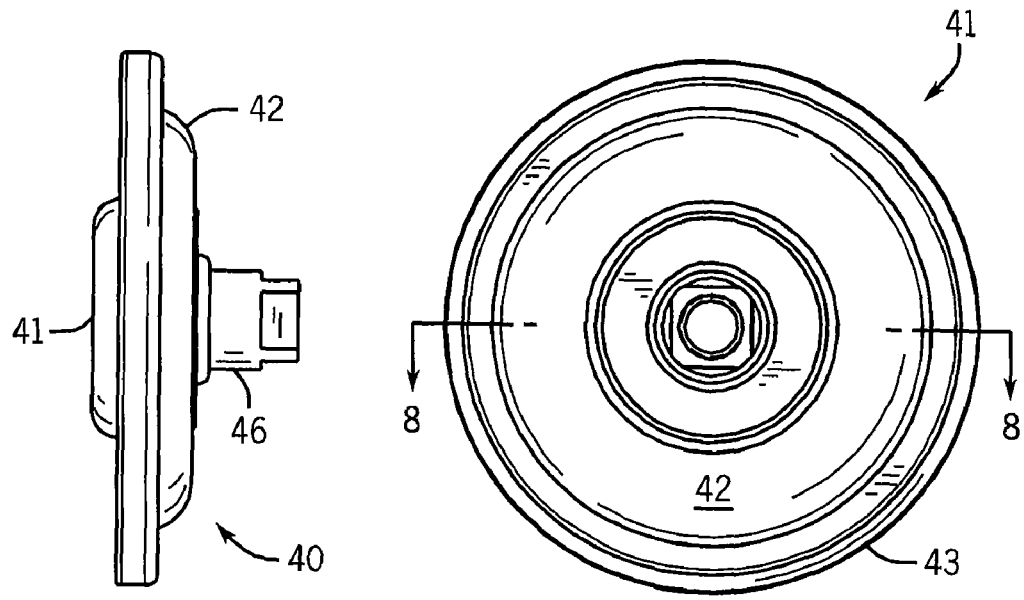
FIG. 6 is a top plan view of a diaphragm valve member.
FIG. 7 is an end view of the diaphragm valve member of FIG. 6.

It is to be noted that the shaped valve member 41 is not a plug, but is a portion of a diaphragm 40. As seen in FIGS. 7 and 8 that diaphragm provides a shaped convex contour of the valve member 41 that is complementary to the concave shape of the valve seat 37, which is formed on an outside diameter, not an inside diameter, which is the common practice. The valve member 41 and the valve seat 37 have complementary profiles in cross section. By matching these complex profiles, controlling the angle, length of engagement and valve orifice diameter, a desired flow characteristic can be produced. The annular valve member 41 forms a sidewall 41a (FIG. 8) oriented at eleven degrees to twelve degrees from perpendicular to a centermost flat portion 41b of the diaphragm member 41 to conform to the sidewall 37a in the groove 37 seen in FIG. 5, which has a complementary angle from vertical in a range from eleven degrees to twelve degrees from perpendicular to a plane defined by the rim 36a of the upper valve opening 36. In the preferred embodiment, the surface of engagement formed by groove 37 has a cross-sectional surface width dimension in a range from 0.40 to 0.50 inches. These dimensions are relative to valve size and can be varied for valves of different size.

This configuration avoids excessively tight machining tolerances. The shape of the seat, the extent of the contact surface, and the chosen angle of the contact surfaces, all combine to determine the characteristic of flow change, completely eliminating the need for the tight-tolerance shaped plug of FIG. 1.

Figure 9:
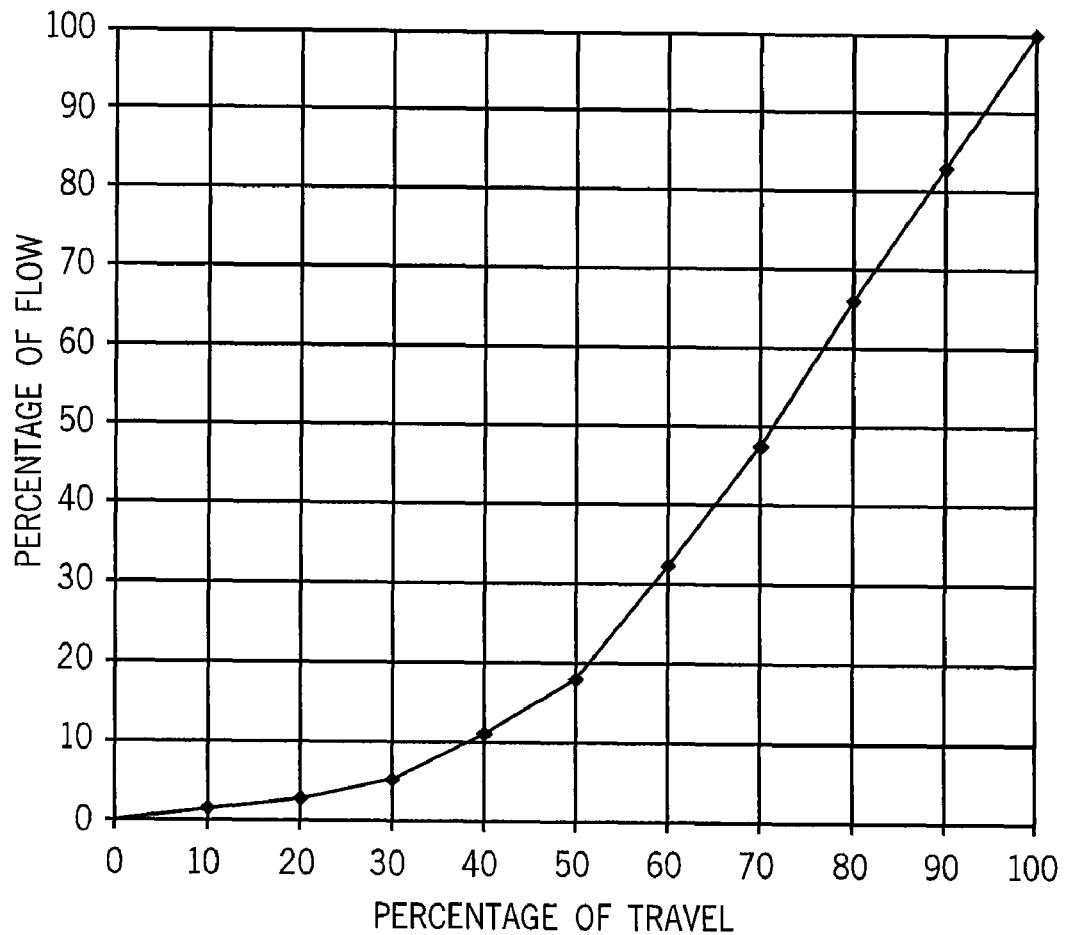
FIG. 9 is a graph of percentage of flow vs. percentage of travel for a valve member.

A desirable flow characteristic that this design produces is illustrated in FIG. 9, which is graph of the percentage volume of flow vs. the percentage of valve stem travel. This graph shows a parabolic flow versus travel characteristic at the bottom of the curve where flow is low and the user is provided ultra fine control of the flow stream. Beginning from the closed position (0% travel), as upward travel of the plug begins, a very thin labyrinthine flow path is created that slows the flow stream, effectively inducing laminar flow. As the valve member 41 continues its upward movement away from the seat 37, the flow path continues to widen allowing increased flow volume. Based on the complex combination of shape and travel the initial flow exhibits a very slow, soft start (up to 30% travel), then ramps up quickly as the valve opens and the need for flow increases. During this travel, there is created a point where the flow transitions from laminar to transitional then to turbulent flow. Furthermore these points transition very smoothly without abrupt changes. As the valve opens (travel increases) the characteristic smoothly transitions into a more linear characteristic as the flow stream reaches full turbulent flow. Both of these occurrences are highly desirable from a control perspective.

The present invention departs from the prior art by shaping the exterior surface of the seat area rather than shaping only the plug to vary and ultimately control flow. From a manufacturing perspective, the concave shape can be produced in a variety of metals for industrial applications, sanitary applications or molded in plastic or an elastomer/plastic combination for use in aseptic valve applications. Whether metal or plastic, tight machining tolerances can be avoided which is not the case with other plug style designs.

This has been a description of a preferred embodiment, but it will be apparent to those of ordinary skill in the art that variations may be made in the details of these specific embodiments without departing from the scope and spirit of the present invention, and that such variations are intended to be encompassed by the following claims.

We claim:

1. A diaphragm valve for aseptic applications, the valve comprising:
    a valve actuator including a reciprocally moveable valve stem that is moved longitudinally to open and close the valve;
    a valve body that includes a fluid outlet chamber and a tubular portion extending upwardly from the fluid outlet chamber, the tubular portion having an upper end extending around a valve opening, wherein said tubular portion has a valve seat located at the upper end and around the valve opening;
    a diaphragm having a central portion connected by a flexible web portion to an outer stationary portion of the diaphragm, the central portion including an annular valve member of resilient membranous material and the central portion being operatively connected to the valve actuator for movement of the annular valve member into the valve seat to close the valve and for movement of the valve member away from the valve seat to open the valve; and
    wherein the valve seat is provided by a groove formed in the upper end of the tubular portion, the groove extending along an outer diameter of the upper end of the tubular portion, said groove providing a concave surface; and
    wherein the annular valve member forms a convex surface of complementary shape to the concave surface the valve seat; and
    wherein said convex surface is moved into the groove to contact the concave surface around the outer diameter of the upper end of the tubular portion of the valve body when the valve is closed.

2. The aseptic valve of claim 1, wherein the diaphragm forms a valve member with at least a coating of polytetrafluoroethylene material on a valve contact surface.

3. The aseptic valve of claim 1, wherein the groove around the valve seat has a sidewall oriented at an angle from eleven degrees to twelve degrees from perpendicular to a plane defined by the upper end of the tubular portion that extends around the valve opening.

4. The aseptic valve of claim 3, wherein the annular valve member forms a sidewall oriented at eleven degrees to twelve degrees from perpendicular to a centermost portion of the diaphragm, so that the sidewall of the valve member conforms in shape to the sidewall in the groove.

5. The aseptic valve of claim 4, wherein the concave surface formed by the groove has a cross sectional surface width dimension in a range from 0.40 to 0.50 inches.

6. The aseptic valve of claim 1, wherein the concave surface formed by the groove has a cross sectional surface width dimension in a range from 0.40 to 0.50 inches for a ½-inch sized valve.

7. The aseptic valve of claim 6, wherein the annular valve member forms a sidewall oriented at eleven degrees to twelve degrees from perpendicular to a centermost portion of the diaphragm, so that the sidewall of the valve member conforms in shape to the sidewall in the groove.

8. The aseptic valve of claim 1, wherein the actuator is a pneumatic actuator.

9. The aseptic valve of claim 1, wherein the actuator is a hydraulic actuator.

10. The aseptic valve of claim 1, wherein the actuator is an electrical actuator.

11. The aseptic valve of claim 1, wherein said tubular portion is an inlet portion;
    wherein said fluid outlet chamber separates the tubular portion from an outer wall of the valve body; and
    wherein said tubular portion also has the valve opening communicating between the fluid passageway and a fluid outlet chamber.

12. The aseptic valve of claim 1, wherein the outer stationary portion of the diaphragm is held in a cylindrical groove in an upper rim of the outer wall of the valve body.

13. The aseptic valve of claim 1, wherein the valve is configured and sized such that the valve provides a controllable flow characteristic having minimum flow up to 30% travel of the valve member, then increases up to a point where the flow transitions from laminar to transitional, and then to turbulent flow in a linear fashion without abrupt changes.

* * * * *